(12) United States Patent
Ravenhall et al.

(10) Patent No.: US 6,217,283 B1
(45) Date of Patent: Apr. 17, 2001

(54) COMPOSITE FAN PLATFORM

(75) Inventors: John A. Ravenhall, Hamilton; Brian M. Davis, West Chester; Thomas C. Mesing, Loveland, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/294,551

(22) Filed: Apr. 20, 1999

(51) Int. Cl.$^7$ ........................................................ F01D 5/22
(52) U.S. Cl. ................... 416/2; 416/193 A; 416/196 R; 416/229.4; 416/230; 416/241 A; 415/9
(58) Field of Search ..................... 415/9; 416/2, 190, 416/191, 193 A, 196 R, 219 R, 220 R, 221, 229 A, 230, 241 A, 248

(56) References Cited

U.S. PATENT DOCUMENTS

| | | | |
|---|---|---|---|
| 3,294,364 | * 12/1966 | Stanley | 416/219 R |
| 3,625,634 | * 12/1971 | Stedfeld | 416/230 |
| 3,712,757 | * 1/1973 | Goodwin | 416/196 R |
| 4,655,687 | * 4/1987 | Atkinson | 416/193 A |
| 5,049,035 | * 9/1991 | Marlin | 416/193 A |
| 5,277,548 | * 1/1994 | Klein et al. | 416/193 A |
| 5,281,096 | 1/1994 | Harris et al. | |
| 5,375,978 | * 12/1994 | Evans et al. | 416/230 |
| 5,464,326 | * 11/1995 | Knott | 416/193 A |
| 5,466,125 | * 11/1995 | Knott | 416/193 A |
| 5,890,874 | * 4/1999 | Lambert et al. | 416/913 A |

FOREIGN PATENT DOCUMENTS

| | | | | |
|---|---|---|---|---|
| 216406 | * | 5/1958 | (AU) | 416/193 A |
| 2006883 | * | 5/1979 | (GB) | 416/193 A |

* cited by examiner

Primary Examiner—Christopher Verdier
(74) Attorney, Agent, or Firm—Andrew C. Hess; Nathan D. Herkamp

(57) ABSTRACT

A platform for a turbofan gas turbine engine that does not limit the rotation capability of adjacent fan blades in the event one of the fan blades is impacted by a foreign object. The platform includes a structural body portion and an integrally formed flowpath surface portion. The structural body portion has a contour that matches that of the adjacent fan blades. The flowpath surface portion defines a pair of wings that extend laterally beyond the structural body portion. The wings are frangible so as to break off if an adjacent fan blade rotates in response to an ingestion event. The platform is made from a composite material using a resin transfer molding process.

13 Claims, 5 Drawing Sheets

COMPOSITE FAN PLATFORM

BACKGROUND OF THE INVENTION

This invention relates generally to gas turbine engines and more particularly to discrete airflow platforms disposed between adjacent fan blades in such engines.

A turbofan gas turbine engine used for powering an aircraft in flight typically includes, in serial flow communication, a fan assembly, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

The fan assembly includes a plurality of circumferentially spaced apart fan blades extending radially outwardly from a rotor disk. The fan blades generally comprise an airfoil section and an integral dovetail root section. The dovetail section is slidably received in a complimentary configured dovetail slot formed in the rotor disk so as to attach the blade to the rotor disk. Fan blades are typically made of either a metal, such as titanium, or a composite material.

While known fan assemblies are highly effective under normal operating conditions, they can sometimes be susceptible to foreign object damage, i.e., damage resulting from the ingress of foreign objects such as birds or hailstones. If a large foreign object impacts a fan blade, the fan blade, or a portion thereof, could break off from the rotor disk. A detached fan blade could damage adjacent fan blades and create a large imbalance in the fan assembly. Furthermore, if not contained by the fan casing, a detached fan blade could cause considerable damage to the aircraft powered by the engine. To reduce the amount of blade material lost during an ingestion event, it is known to design fan assemblies so as to permit limited rotation of the blade root section within the dovetail slot in response to an extreme force exerted on the blade. This rotation will often prevent breakage of the blade at its base.

During engine operation, ambient airflow is channeled between the rotating blades and pressurized thereby for generating thrust for powering the aircraft in flight. A radially inner flowpath boundary for the airflow channeled between the blades is provided by fan platforms located between adjacent fan blades, near the rotor disk. It is known to produce fan blades having integrally formed platforms. However, this means that the centrifugal loads from both the fan blade airfoils and the platforms must be carried by the fan blade dovetails, which requires that the dovetails be suitably large, which in turn requires a suitably large rotor disk for accommodating all of the centrifugal loads within acceptable stress limits. Furthermore, damage to such an integrally formed platform will often require replacement of the entire blade. And it is impractical from a manufacturing standpoint to integrally form the platforms with the blade in the case of composite fan blades.

Accordingly, fan assemblies have been developed using discrete platforms independently joined to the rotor disk between adjacent fan blades. These separate platforms must have suitable strength for accommodating both centrifugal loads and impact loads, such as those due to a bird strike, during operation. One such configuration is a hybrid construction comprising a forged aluminum machined structural body having a composite flowpath surface bonded thereto. The structural body portion is formed with a straight wall box shape for ease of machining. Because the adjacent fan blades have a curved contour, this straight wall construction leads to hard body pinch points between the fan blade, fan platform and rotor disk during foreign objection ingestion events. Such pinch points limit the fan blade rotation capability in response to a blade being struck by a foreign object.

Furthermore, the composite flowpath surface must be secondarily bonded in an additional operation and requires the use of redundant bolted fastening features through the structural side walls to insure flowpath retention. And the aluminum structural body must be shotpeened and primed prior to composite bonding. This results in a relatively heavy platform that is expensive to manufacture.

Accordingly, there is a need for a lightweight, easily manufactured fan platform that does not limit the rotation capability of the adjacent fan blades.

SUMMARY OF THE INVENTION

The above-mentioned needs are met by the present invention which provides a platform for use between adjacent fan blades joined to a rotor disk to provide an inner flowpath boundary. The platform includes a structural body portion and an integrally formed flowpath surface portion. The structural body portion has a contour that matches that of the adjacent fan blades. The flowpath surface portion defines a pair of wings that extend laterally beyond the structural body portion. The wings are frangible so as to break off if an adjacent fan blade rotates in response to an ingestion event. The platform is made from a composite material using a resin transfer molding process.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
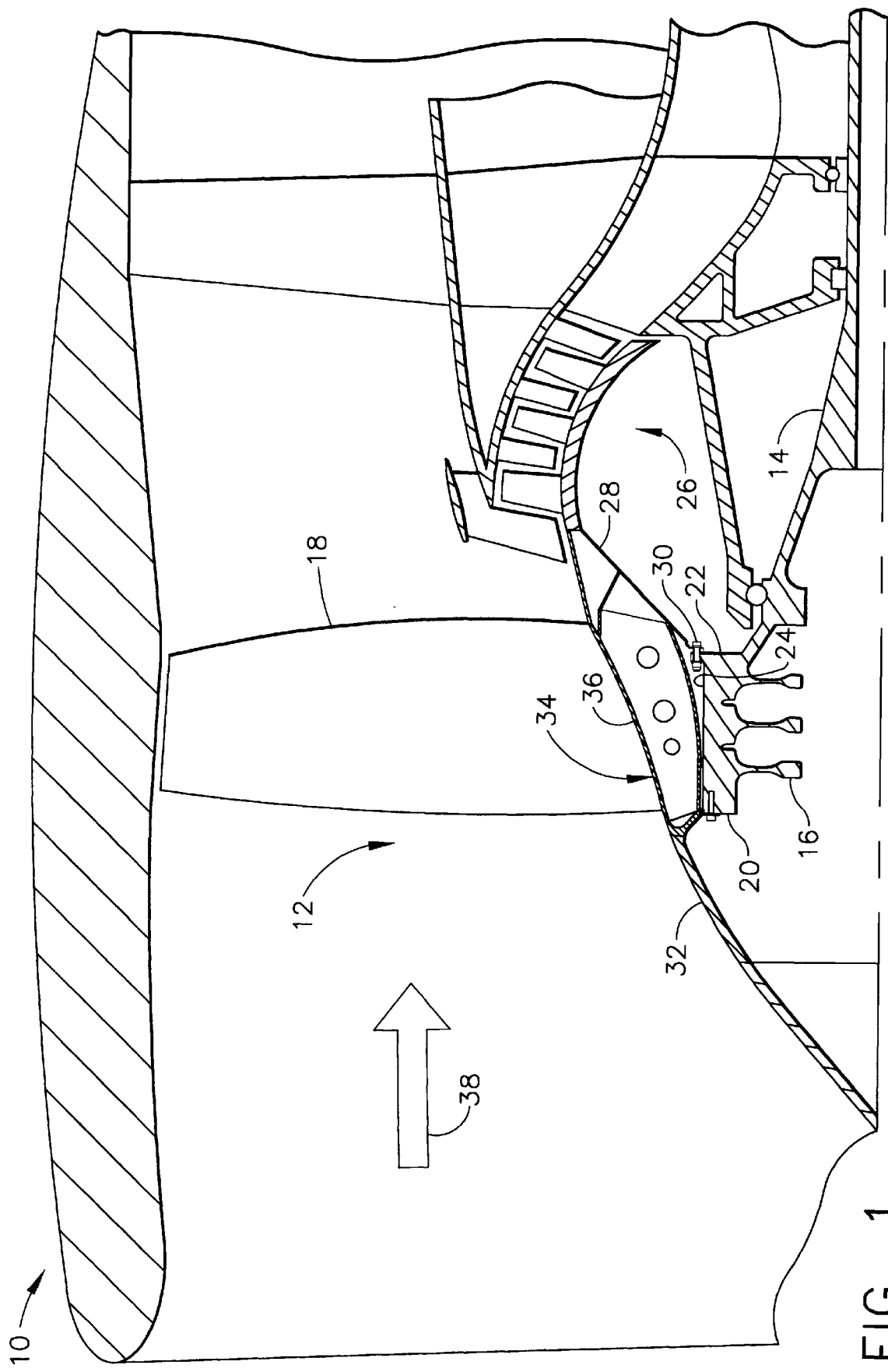
FIG. 1 is a partial cross-sectional view of an exemplary turbofan gas turbine engine having the discrete fan platforms of the present invention.

Referring to the drawings wherein identical reference numerals denote the same elements throughout the various views, FIG. 1 shows an exemplary turbofan gas turbine engine 10 used for powering an aircraft in flight (not shown). The engine 10 includes a fan assembly 12 which is rotated by a conventional fan shaft 14 powered by a conventional low pressure turbine (not shown). The fan assembly 12 includes a rotor disk 16 from which extends radially outwardly a plurality of circumferentially spaced apart fan or rotor blades 18 (only one shown in FIG. 1). The rotor disk 16 includes axially spaced apart forward and aft sides 20 and 22, respectively, and a radially outer surface 24 extending therebetween.

Disposed downstream of the fan assembly 12 is a conventional booster compressor 26 having axially spaced apart vane and blade rows, with the blades thereof being joined to a booster spool or shaft 28. The booster shaft 28 is suitably fixedly joined to the rotor disk aft side 22 by a plurality of bolts 30. A conical spinner 32 is joined to the rotor disk forward side 20 to provide an aerodynamic flow path for air 38 entering the fan assembly 12.

The present invention includes a plurality of discrete platforms 34 (only one shown in FIG. 1) that are provided between the fan blades 18, with each platform 34 being disposed between respective adjacent ones of the fan blades 18 and radially beyond the rotor disk 16. Each of the platforms 34 has a radially outer surface 36 extending between the respective adjacent fan blades 18 so as to collectively define an inner flowpath boundary for channeling air 38 between the fan blades 18. Thus, the platforms 34 function to maintain the engine flowpath definition between the spinner 32 and the booster 26.

Figure 2:
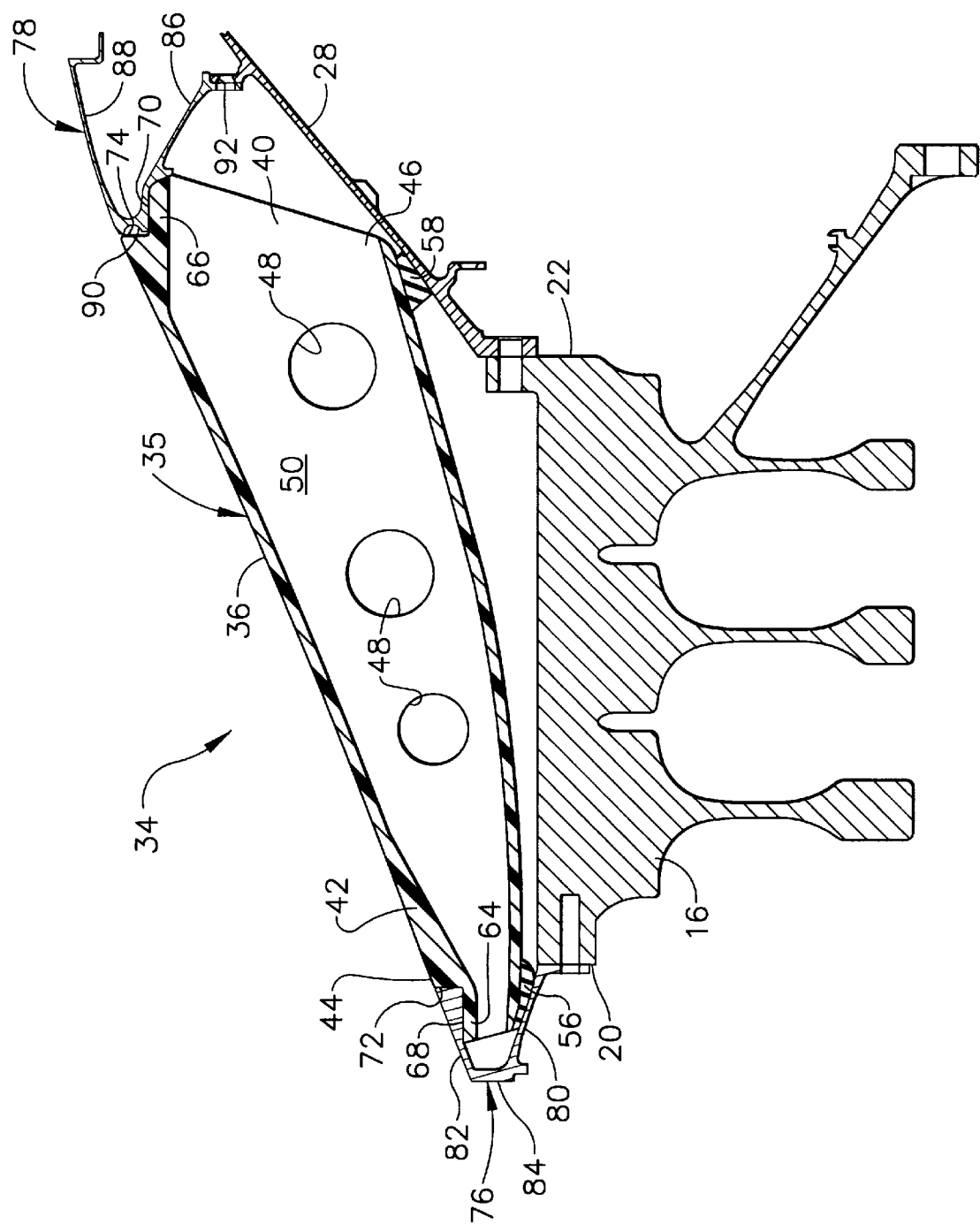
FIG. 2 is an enlarged cross-sectional view of one of the fan platforms of the present invention.
Figure 3:
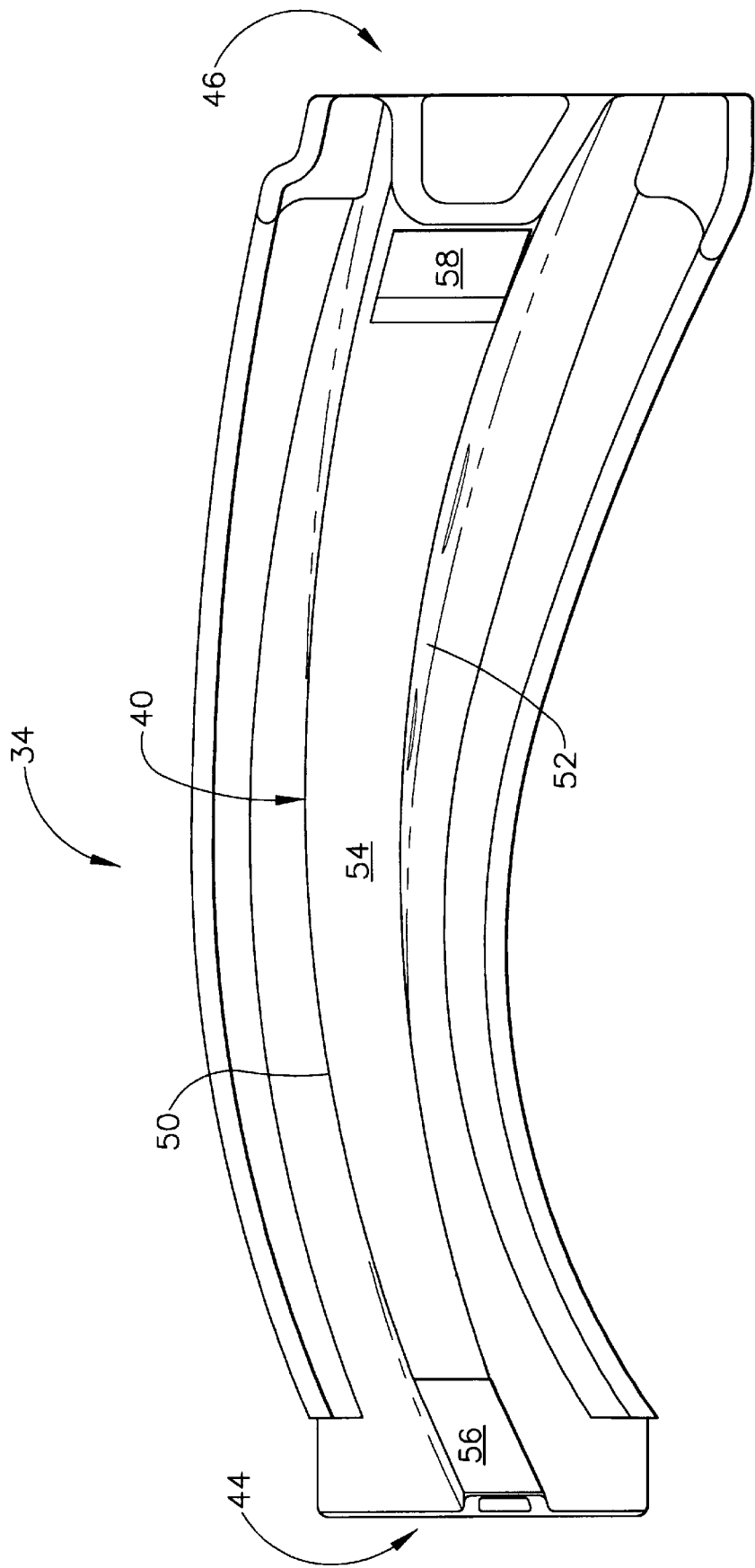
FIG. 3 is a bottom view of the fan platform of FIG. 2.
Figure 4:
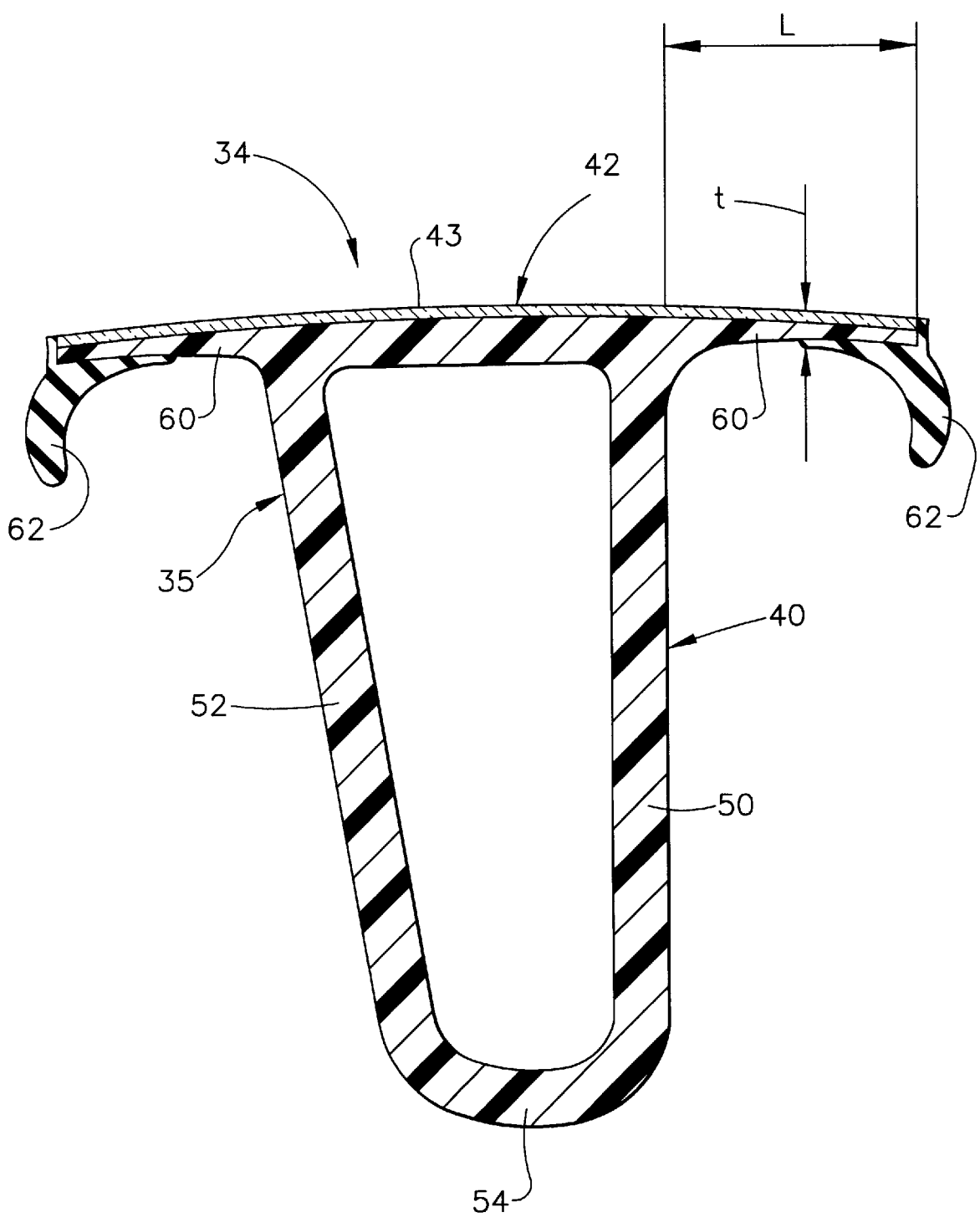
FIG. 4 is an axial cross-sectional view of the fan platform of FIG. 2.

Turning to FIGS. 2–4, a single fan platform 34 is shown in greater detail. The platform 34 includes a unitary, integrally formed member 35 comprising a structural body portion 40 and a flowpath surface portion 42 which are joined in a substantially T-shaped configuration in cross-section (see FIG. 4). As best seen in FIG. 2, the platform 34 has a forward end 44 disposed near the disk forward side 20, and an axially opposite aft end 46 disposed near the disk aft side 22. The body portion 40 contributes the bulk of the platform's mass and consequently provides the platform 34 with the necessary strength to carry its centrifugal load.

To reduce the overall weight of the platform 34 while maintaining suitable strength thereof, the integral member 35 is preferably made from a non-metal, composite material. For example, one suitable composite material would be graphite fibers embedded in an epoxy resin. Furthermore, the structural body portion 40 is a hollow body having a first side wall 50, a second side wall 52 and a radially inner surface 54 extending between the two side walls 50, 52. The structural body portion 40 is open at both the forward end 44 and the aft end 46. The open ends inhibit accumulation of fluids, such as rain water or melted ice, inside the hollow body portion 40 by allowing a centrifugal drainage path during engine operation. To further reduce weight, a number of weight relief holes 48, shown in first side wall 50 in FIG. 2, are formed in each side wall 50, 52 of the structural body portion 40.

Referring to FIG. 3, it is seen that the structural body portion 40 has a curved contour extending from the forward end 44 to the aft end 46, as opposed to a straight wall configuration. This contour is chosen to substantially match the contour of the adjacent fan blades 18 between which the platform 34 will be disposed. That is, the first side wall 50 of the body portion 40 has a convex curvature that closely follows the concave curvature of pressure side of its adjacent blade, and the second side wall 52 of the body portion 40 has a concave curvature that closely follows the convex curvature of suction side of the blade adjacent to it.

The structural body portion 40 also has a forward positioning bumper 56 attached to the radially inner surface 54 adjacent to the forward end 44 and an aft positioning bumper 58 attached to the radially inner surface 54 adjacent to the aft end 46. Both the forward and aft positioning bumpers 56, 58 are made of any suitable resilient material such as rubber and function to radially locate the platform 34 with respect to the rotor disk 16, as will be described more fully below. The positioning bumpers 56, 58 are secondarily bonded to the radially inner surface 54 of the body portion 40 in any suitable manner such as with adhesive.

The flowpath surface portion 42 is integrally formed at the radially outermost extent of the structural body portion 40 so as to define the radially outer surface 36 of the platform 34 that fixes the inner flowpath boundary. As best seen in FIG. 4, the flowpath surface portion 42 extends laterally (i.e., circumferentially) beyond each side wall 50, 52 of the structural body portion 40 to define a pair of thin wings 60. The wings 60 extend blade-to-blade so as to completely fill the space between adjacent blades 18, thereby maintaining the inner flowpath boundary between the spinner 32 and the booster 26. Like the side walls 50, 52 of the body portion 40, the outer lateral edges of the wings 60 are provided with a curved contour that matches the contour of the corresponding adjacent fan blade 18. Furthermore, the outer lateral edge of each wing 60 is provided with a resilient seal member 62 to seal fan blade air leakage during engine operation. The edge seals 62 are secondarily bonded to the wings 60, preferably with a film adhesive, and are made of a suitable material such as silicone.

The flowpath surface portion 42 provides the necessary strength to meet fan overspeed requirements, low cycle fatigue, and ingestion requirements, but the wings 60 are sufficiently thin so as to be frangible in the event of hard impact crush loads between a fan blade 18 and the platform 34 that can occur during ingestion events. As shown in FIG. 4, the wings 60 are provided with a thickness, t, and a wing overhang or width, L. The ratio of the wing width, L, to the thickness, t, varies across the wings 60 because of their curved contour. Preferably, the aft portion of the wing 60 that is on the concave side of the platform 34 has a width-to-thickness ratio that is equal to or greater than 40 to provide sufficient frangibility. The width-to-thickness ratio varies between 20 and 40 for the other portions of the wings 60.

In addition, a thin glass fabric layer 43 is disposed on the radially outermost surface of the flowpath surface portion 42 for erosion protection. The glass fabric layer 43 has good erosion resistance and also serves a sacrificial function in the event of a foreign object impact. Specifically, as long as the platform's composite material is not penetrated as the result of a foreign object impact (i.e., only the glass fabric layer is damaged), then platform repair is typically a simple task. Penetration of the composite material will require a more difficult repair or replacement of the platform. The integral member 35 is provided with one or more coats of a high gloss polyurethane paint for additional erosion protection.

Referring again to FIG. 2, it can be seen that the platform 34 has a forward mounting flange 64 extending axially outward from the forward end 44 and an aft mounting flange 66 extending axially outward from the aft end 46. The forward and aft mounting flanges 64, 66 are configured so as to define forward and aft radially outward-facing abutment surfaces 68 and 70, respectively, and forward and aft axially facing abutment surfaces 72 and 74, respectively. Each abutment surface 68, 70 has a wear strip, made of a wear resistant material such as an aramid fiber combined with polytetrafluoroethlene fiber woven into a suitable fabric, bonded thereto.

The platform 34 is retained by a forward support ring 76 and an aft support ring 78. The forward support ring 76 is an annular member that is substantially C-shaped in cross-section and includes a radially inner segment 80, a radially outer segment 82, and a middle portion 84 joining the two segments 80, 82. The inner segment 80 is fixedly joined at its distal end to the forward side 20 of the rotor disk 16 by a plurality of bolts, for example. The radially outer segment 82 overlaps the forward mounting flange 64 and engages the forward radial abutment surface 68, thereby retaining the forward end 44 of the platform 34 against radially outward movement due to centrifugal force upon rotation of the rotor disk 16 during engine operation. Furthermore, the distal end of the outer segment 82 abuts the forward axially facing abutment surface 72 to restrain the platform 34 against forward axial movement. The middle portion 84 of the forward support ring 76 abuts the aft end of the spinner 32. Optionally, the forward support ring 76 may be an integral portion of the otherwise conventional spinner 32.

The aft support ring 78 is an annular member that is substantially V-shaped in cross-section and includes a radially inner segment 86 and a radially outer segment 88 joined together at an intersection that defines an abutment 90. The inner segment 86 is fixedly joined at its distal end to a mounting flange 92 formed on the booster shaft 28. The abutment 90 overlaps the aft mounting flange 66 and engages the aft radial abutment surface 70, thereby retaining the aft end 46 of the platform 34 against radially outward movement due to centrifugal force upon rotation of the rotor disk 16 during engine operation. The abutment 90 also engages the aft axially facing abutment surface 74 so as restrain the platform 34 against axial movement in the aft direction.

During installation of the platform 34, the forward and aft positioning bumpers 56, 58 radially locate the platform 34 with respect to the rotor disk 16 to provide the desired clearance between the platform 34 and the radially outer surface 24 of the rotor disk 16. The forward positioning bumper 56 contacts the inner segment 80 of the forward support ring 76, and the aft positioning bumper 58 contacts the booster shaft 28. The forward and aft positioning bumpers 56, 58 also prevent the platform 34 from clanking against the rotor disk 16, the booster shaft 28, or the forward and aft support rings 76, 78.

Figure 5:
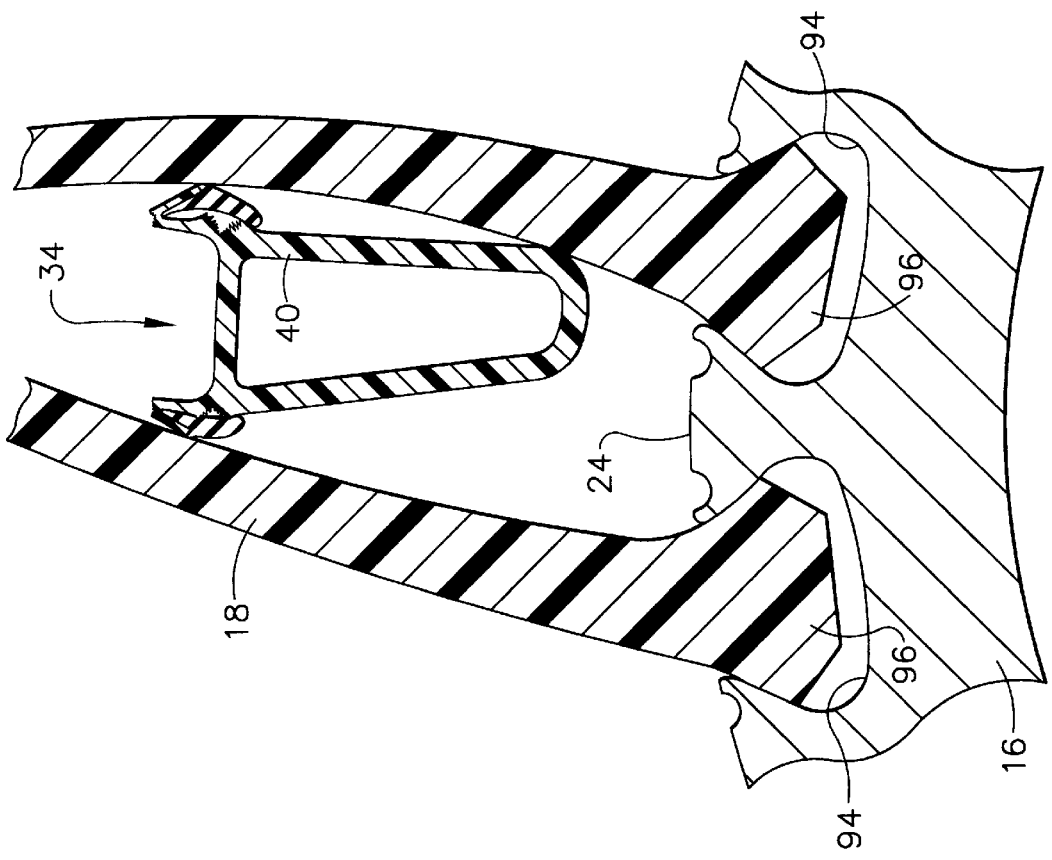
FIG. 5 is an end view of a fan platform disposed between two adjacent fan blades in a normal operating condition.
Figure 6:
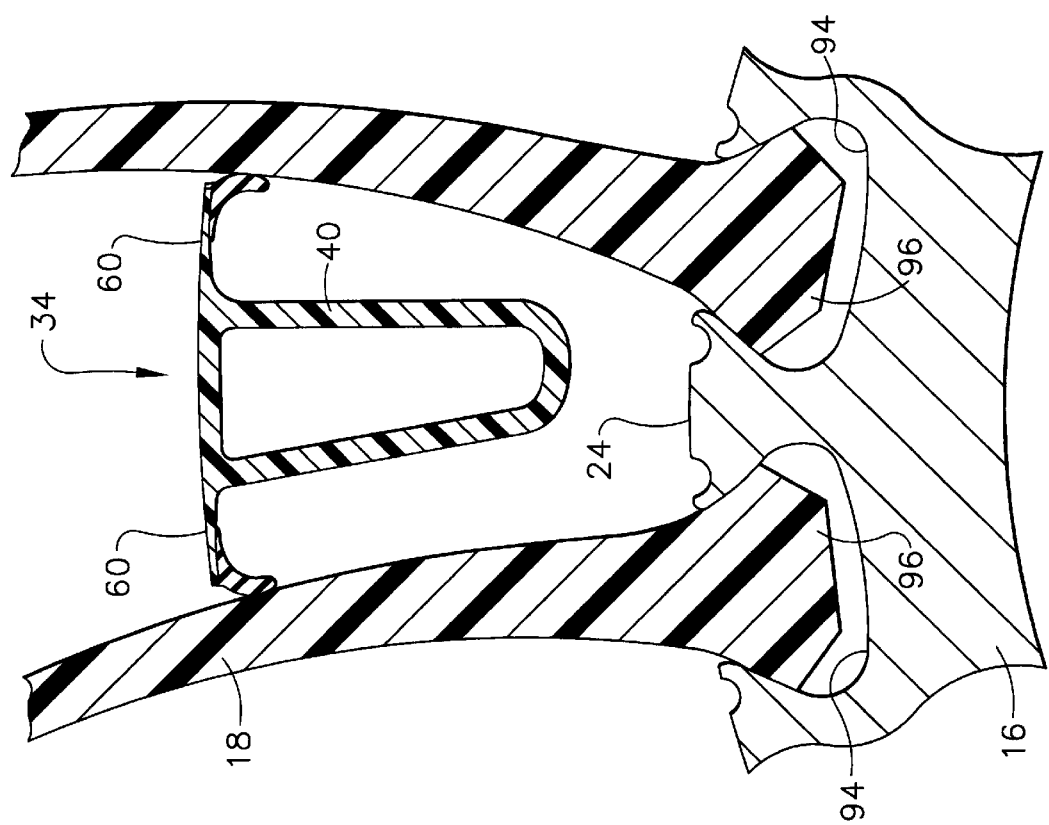
FIG. 6 is an end view of a fan platform disposed between two adjacent fan blades after an ingestion event.

Referring to FIGS. 5 and 6, the rotor disk 16 includes a plurality of circumferentially spaced apart axial dovetail slots 94 which extend radially inwardly from the disk outer surface 24, with the disk portions between the dovetails slots 94 also being known as dovetail posts. Each of the fan blades 18 includes an integral root section 96 that is in the form of a complementary axial-entry dovetail. The dovetail root sections 96 are disposed in respective ones of the dovetail slots 94 for attaching the fan blades 18 to the rotor disk 16. As is known in the art, the dovetail slots 94 and root sections 96 are designed so as to permit limited rotation of the root section 96 within the dovetail slot 94 in response to an extreme force exerted on the blade 18. This blade rotation capability substantially reduces the blade's susceptibility to foreign object damage.

As discussed above, the body portion 40 has a curved contour that follows the contour of the adjacent fan blades 18. The contoured body portion 40 allows increased blade rotation relative to the blade rotation possible with conventional fan platforms having a straight wall configuration by eliminating hard body pinch points between the platform 34, the fan blades 18 and the rotor disk 16 during ingestion events. The contoured configuration also facilitates installation of the platform 34. As shown in FIG. 5, which represents the fan assembly 12 under normal operating conditions, the structural body portion 40 is sized and configured to provide adequate clearance with the rotor disk 16 and the adjacent blades 18 such that blade rotation capability is not overly hindered by binding between the platform 34 and the blades 18 or rotor disk 16. Thus, as shown in FIG. 6, if one of the fan blades 18 (the leftmost blade in the Figure) is struck by a foreign object, the blade 18 will rotate within its dovetail slot 94 in response to the impact. As the blade 18 rotates, the frangible wings 60 will break off, allowing the blade 18 to rotate throughout its rotation capability, which is typically about 18 degrees. Although the wings 60 are crushed during an ingestion event, the structural body portion 40, which provides the bulk of the platform's mass, stays relatively intact. Thus, very little of the platform's mass is lost so that most of the function of defining an inner flowpath boundary is retained.

The platform 34 is preferably manufactured using a resin transfer molding (RTM) process in which fibers of a suitable material such as graphite are arranged in a desired orientation on a mandrel so as to approximate the desired shape of the finished part. This preform is then placed in a mold having a cavity matching the shape of the integral member 35. A thin glass fabric mat is added to the mold, next to the surface of the preform that will become the flowpath surface portion 42 of the integral member 35. The next step is to inject a resin such as an epoxy into the mold under moderate pressure so as to impregnate the fibers. The resin impregnated preform is then cured; the glass fabric mat is co-cured to form the glass fabric layer 43. After curing, the mandrel is removed, and the integral member 35 is provided with one or more coats of a high gloss polyurethane paint.

Once the integral member 35 is finished, the forward and aft positioning bumpers 56, 58 are bonded to the radially inner surface 54 of the body portion 40. The seal members 62 are bonded to the outer lateral edge of each wing 60, and a wear strip is bonded to the forward and aft radially outward-facing abutment surfaces 68, 70 of the forward and aft mounting flanges 64, 66, respectively. Thus, this is a relatively simple and inexpensive process for producing the lightweight fan platform of the present invention.

The foregoing has described a discrete, composite fan platform that does not limit the rotation capability of the adjacent fan blades and a process for making such a platform. While specific embodiments of the present invention have been described, it will be apparent to those skilled in the art that various modifications thereto can be made without departing from the spirit and scope of the invention as defined in the appended claims.

What is claimed is:

1. A platform for use between adjacent fan blades joined to a rotor disk to provide an inner flowpath boundary, said platform comprising:
   a structural body portion comprising a hollow body having a first side wall, a second side wall, a radially inner surface extending between said first and second side walls, and open ends, said structural body portion having a contour that matches that of said adjacent fan blades; and
   a flowpath surface portion joined to said structural body portion, said flowpath surface portion defining a pair of frangible wings that extend laterally beyond said structural body portion.

2. The platform of claim 1 wherein said structural body portion and said flowpath surface portion form an integral member.

3. The platform of claim 2 wherein said integral member is made of a composite material.

4. The platform of claim 3 wherein said composite material includes graphite fibers in an epoxy resin.

5. The platform of claim 1 wherein each one of said first and second side walls has at least one weight relief hole formed therein.

6. The platform of claim 1 wherein said first side wall has a concave curvature and said second side wall has a convex curvature.

7. The platform of claim 1 further comprising a forward positioning bumper attached to said radially inner surface and an aft positioning bumper attached to said radially inner surface.

8. The platform of claim 1 wherein said wings have a width and a thickness and the ratio of the width to the thickness is greater than or equal to 40 in at least a portion of said wings.

9. The platform of claim 1 further comprising a seal member attached to each one of said wings.

10. The platform of claim 1 further comprising a glass fabric layer disposed on said flowpath surface portion.

11. The platform of claim 2 wherein said integral member is provided with at least one coat of polyurethane paint.

12. The platform of claim 1 further comprising a forward mounting flange extending axially outward from a forward end of said platform and an aft mounting flange extending axially outward from an aft end of said platform.

13. A platform for use between adjacent fan blades joined to a rotor disk to provide an inner flowpath boundary, said platform comprising an integral member made of a composite material and including:

- a structural body portion comprising a hollow body having a first side wall, a second side wall, a radially inner surface extending between said first and second side walls, and open ends, said structural body portion having a contour that matches that of said adjacent fan blades; and
- a flowpath surface portion integrally formed on said structural body portion to define a substantially T-shaped configuration, said flowpath surface portion defining a pair of frangible wings that extend laterally beyond said structural body portion.

* * * * *